Dec. 18, 1928.  W. L. OSBORNE  1,696,100
METHOD FOR CLEANING LUBRICANT CASES OF ENGINES
Original Filed July 3, 1924   2 Sheets-Sheet 1
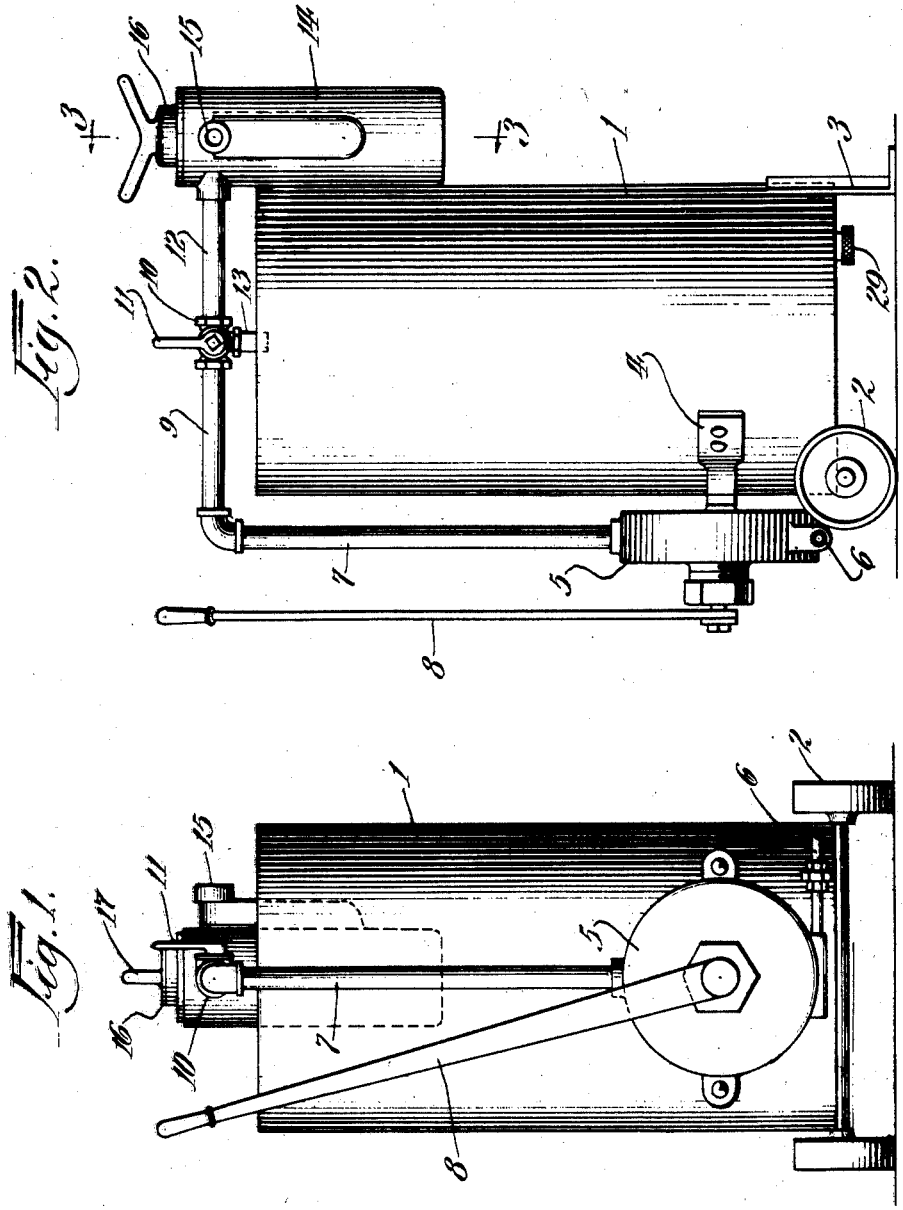

Dec. 18, 1928.  1,696,100
W. L. OSBORNE
METHOD FOR CLEANING LUBRICANT CASES OF ENGINES
Original Filed July 3, 1924 2 Sheets-Sheet 2
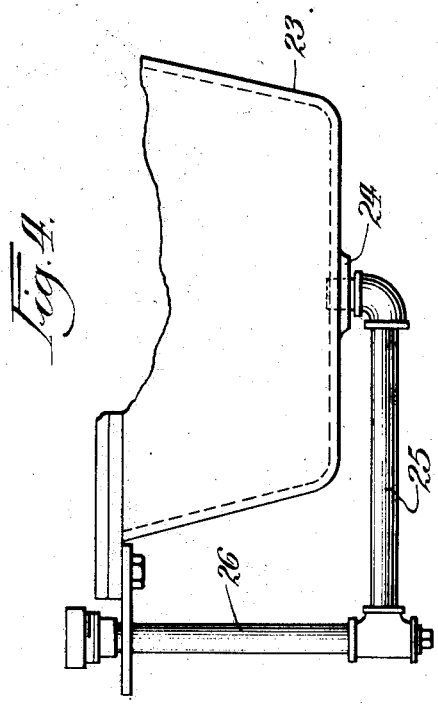
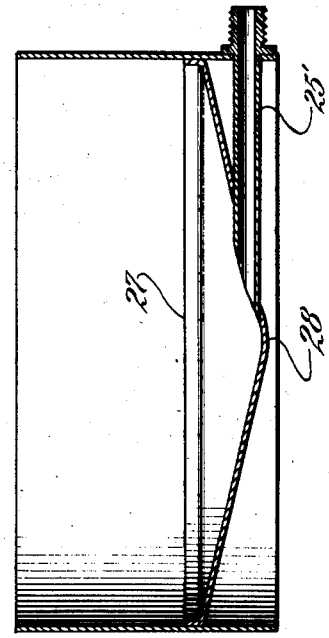
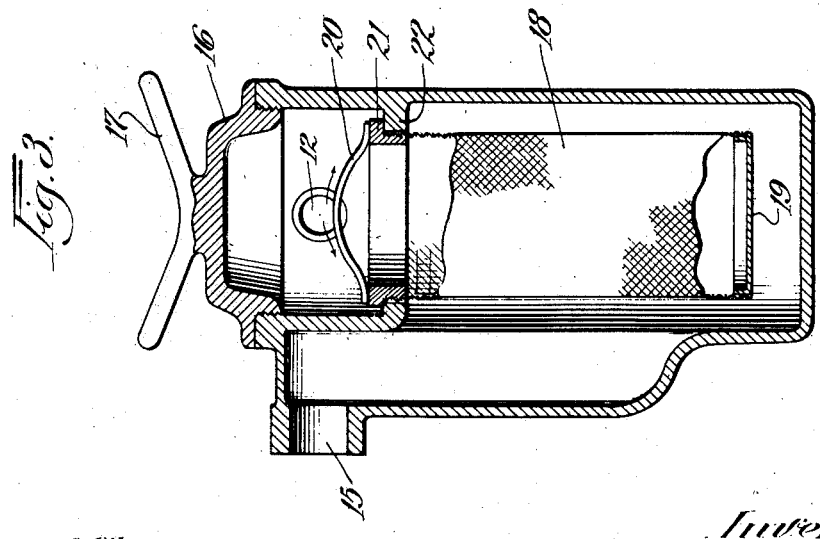

Patented Dec. 18, 1928.

1,696,100

UNITED STATES PATENT OFFICE.

WILLIAM L. OSBORNE, OF LOS ANGELES, CALIFORNIA, ASSIGNOR, BY DIRECT AND MESNE ASSIGNMENTS, TO OSBORNE PROCESS, INC., OF LOS ANGELES, CALIFORNIA, A CORPORATION OF CALIFORNIA.

METHOD FOR CLEANING LUBRICANT CASES OF ENGINES.

Original application filed July 3, 1924, Serial No. 724,089. Divided and this application filed January 15, 1927. Serial No. 161,331.

This application is a division of an original application filed by me, Serial No. 724,089, filed July 3rd, 1924.

This invention relates to improvements in a method for cleaning crank cases of motor vehicles, and refers more particularly to a very effective, and yet simple method for cleaning crank cases, to eliminate all dirt and other foreign particles which may be present therein.

Among the many objects of my invention are to provide a simple and economical method, adapted to be used in conjunction with the crank case of an automobile which it is desired to clean; to provide a process for withdrawing the used lubricant and passing the same to storage, and for maintaining a cyclic circulation of flushing oil to and through the crank case; to provide a process for filtering said flushing oil during the cyclic circulation; to provide a process for forcing said flushing oil to and through the filter to the crank case, thus maintaining a suction on the crank case discharge, and in general to provide an improved process of the character referred to.

In the maintenance of a motor vehicle, whether truck or pleasure car, one of the most vital problems confronting the user is the proper lubricating of the parts enclosed by the crank case, as all bearings and other moving parts are lubricated from the oil contained in this crank case, and it is therefore essential that this case, together with the oil contained therein, be kept clean and free from dirt, grindings and other foreign material.

Various attempts have been made to place filters on motor vehicles, but for many reasons these devices have failed to operate successfully. The question has been solved by employing the usual custom of continuously pouring new oil into the crank case and withdrawing said oil at irregular intervals, leaving the dirt and heavy particles that may have been mixed with this oil in the crank case. Flushing oil is then introduced into the crank case, and the engine allowed to run, the supposition being that the circulation and agitation will be sufficient to extract said foreign particles from their lodgment in the crank case. This flushing oil is then drawn off, the crank case plugged, and fresh lubricating oil is poured in, mixing with whatever foreign particles have been left in the crank case after the flushing operation.

Actual experience has indicated that less than one-fourth of the foreign particles are thus withdrawn from the crank case. In addition, this method is very dirty and unpleasant, and naturally is done only when absolutely necessary.

To overcome these objections and to remove all of the foreign particles that may be in the crank case, and to do so in an efficient, clean and economical manner, I have perfected the following:

In the drawings, Fig. 1 is a front elevational view of the oil storage pump and filtering medium.

Fig. 2 is a side elevational view of the construction shown in Fig. 1.

Fig. 3 is a cross sectional view of the filtering medium taken on the line 3—3 of Fig. 2.

Fig. 4 is an enlarged view showing the drawoff from the crank case.

Fig. 5 is a sectional view of the particular form of drip pan which it may be necessary to employ.

Referring in detail to the drawings, 1 designates as a whole, an enlarged cylindrical drum or tank which may be for instance 16 inches in diameter and 30 inches in height, holding from 30 to 35 gallons more or less, as may be desired. This drum may be provided with base wheels 2 and support 3. Mounted exteriorly of the chamber 1 is the bracket 4 on which is supported the pump 5. This pump may be provided with inlet 6 and outlet 7, and may also be provided with the handle 8 which is adapted to be oscillated back and forth. The particular and detailed construction of the pump forms no part of the present invention, as any suitable type of pump of this general character may be used. The pipe 7 has an extension 9 in which is interposed a three-way valve 10 adapted to be manipulated by the handle 11. Beyond the valve 10 is a continuation 12 of the pipe 9. Below the valve 10 is the pipe 13 adapted to be connected to the upper portion of the chamber 1. The outlet end of the pipe 12 is adapted to be connected to a filtering medium 14 having outlet 15. The particular construction of this filtering medium as shown in Fig. 3 comprises a screw threaded cap 16 provided with the handle 17. The filtering medium comprises a vertical cylindrical chamber as shown. In the interior of the filter is suspended what may be termed a mesh bag filtering screen 18 provided with a solid bottom 19, wire handle 20, which latter is connected to an annular shoulder or supporting portion 21. The annular bearing is adapted to be supported upon the inwardly extending annular shoulder 22 formed within the filter.

Referring now to Figs. 4 and 5, the crank case is designated 23 provided with the outlet or discharge 24 which normally is plugged. As shown in Fig. 4, in this discharge 24 is inserted the drawoff pipe 25 which has an extension 26 communicating with the inlet pipe 6 to the pump. Where it is desired to handle cars having crank cases of the character shown in Fig. 4, it is only necessary to use the mechanism shown there.

Where motor vehicles are not equipped to connect directly to the apparatus, I provide the drip pan 27 which may be tapered inwardly in a downward direction as shown at 28 and having the drawoff 25'.

The operation of the device preferably is as follows: The inlet 6 has a flexible hose connection, the extremity of which is connected to the pipe 26. The used lubricant is entirely withdrawn from the crank case, and forced by means of the oscillation of the pump handle 8 into the storage chamber 1 through the pipe 13, the valve handle 11 being so manipulated as to close the pipe 12. Flushing oil may be then introduced into the crank case through the usual inlet and may be withdrawn as explained. The valve handle 11 is then manipulated so as to close the pipe 13 and open the pipe 12, the arrangement being such that the flushing oil is adapted to pass through the pump, through the pipe 7 and pipe 9 and through the pipe 12 into the filter. The flushing oil then passes through the wire mesh filtering bag 18 which removes the dirt and other foreign particles therefrom, the free flushing oil passing out through the outlet 15, the side of the filter 14 being flared outwardly as shown, to assist in the operation. It is understood, of course, that the pump suction is connected to the outlet from the crank case, and that the operator by oscillating the pump handle, pumps the oil from the crank case either into the storage or filtering methanism.

By continuing the operation of filtering the flushing oil and returning it to the crank case, then withdrawing same and subjecting it to a refiltering action, the flushing oil will continue to be circulated, cleaning not only the crank case by reason of the agitation thereof, but removing all of the entrained dirt and foreign substances which are then deposited in the filter. When the crank case has been sufficiently cleaned, and it is desired to remove the flushing oil, the valve handle 11 is manipulated so as to connect the pipe 9 with the pipe 13, thus closing the pipe 12. The pump lever or handle 8 may be then operated to drain the crank case of the flushing oil which will discharge same into the storage tank or chamber 1. The plug is then inserted in the crank case, and fresh clean lubricating oil introduced thereto.

This method may be continued with a succession of motor vehicles until the oil storage chamber 1 is full, when the entire apparatus may be wheeled to a convenient location and dumped by removing the drain plug 29. This apparatus is inexpensive, and requires no attention from the owner.

In order that the crank case cleaner may be attached directly to the crank case, the following may be attached to the crank case: a drain plug hole is tapped and an elbow inserted therein. Into this may be inserted the ordinary or usual plug.

It must be understood, of course, that the filter mesh bag 18 may be withdrawn and cleaned by merely removing the cap 16 from the filter 14.

I do not wish to limit myself to the particular details of construction shown, except as outlined in the claims.

I claim as my invention:

1. A process which comprises withdrawing used lubricant from a lubricant container, and preventing the return of any substantial portion thereof to said container, thereafter introducing a limited quantity of flushing liquid into said lubricant container, no substantial amount of which had heretofore been used in said container, maintaining a cyclic circulation of said limited quantity of flushing liquid from said container through a filtering medium and back to said container, and finally withdrawing said flushing liquid and thereafter preventing the return of any substantial portion thereof to said container.

2. A process which comprises withdrawing used lubricant from a lubricant container, and preventing the return of any substantial portion thereof to said container, thereafter introducing a limited quantity of flushing liquid into said lubricant container, no substantial amount of which had heretofore been used in said container, maintaining a cyclic circulation of said limited quantity of flushing liquid from said container through a filtering medium and back to said container, finally withdrawing said flushing liquid and thereafter preventing the return of any substantial portion thereof to said container, and thereafter charging said container with a fresh charge of lubricant, no substantial quantity of which had heretofore been introduced to said container.

3. A process which comprises withdrawing used lubricant from a lubricant container and preventing the return of any substantial portion thereof to said container, thereafter introducing flushing liquid, no substantial quantity of which had previously been introduced to said container, while simultaneously withdrawing flushing liquid from said container, said introduction and withdrawal of flushing liquid being continued for a length of time sufficient to remove substantial quantities of foreign material from said lubricant container, finally withdrawing said flushing liquid from said container and thereafter preventing the return of any substantial portion thereof to said container, and thereafter charging said container with a fresh charge of lubricant, no substantial amount of which had previously been introduced to said container.

4. A process which comprises withdrawing used lubricant from a lubricant container and preventing the return of any substantial portion thereof to said container, thereafter introducing flushing liquid under pressure, no substantial quantity of which had previously been introduced to said container, while simultaneously withdrawing flushing liquid from said container, said introduction and withdrawal of flushing liquid being continued for a length of time sufficient to remove substantial quantities of foreign material from said lubricant container, finally withdrawing said flushing liquid from said container and thereafter preventing the return of any substantial portion thereof to said container, and thereafter charging said container with a fresh charge of lubricant, no substantial amount of which had previously been introduced to said container.

5. A process which comprises withdrawing used lubricant from a lubricant container, and preventing the return of any substantial portion thereof to said container, thereafter introducing a limited quantity of flushing liquid into said lubricant container, no substantial amount of which had heretofore been used in said container, thereafter circulating repeatedly through and from such container said flushing liquid under pressure, and in such circulation subjecting the flushing oil to filtration action, removing the foreign matter during each repeated circulation of the flushing oil out of the lubricant container, continuing such circulation until the container is cleaned, finally withdrawing said flushing liquid from said container and thereafter preventing the return of any substantial portion thereof to said container, and thereafter introducing to said container a fresh charge of lubricant, no substantial quantity of which had heretofore been introduced to said container.

6. A process of cleaning lubricant containers containing moving parts, which comprises withdrawing used lubricant therefrom, preventing the return of any substantial portion thereof to said container, thereafter circulating repeatedly through and from such container flushing oil, no substantial amount of which had previously been introduced to said container, under pressure, and in such circulation subjecting the flushing oil to filtration action to catch and retain the foreign matter carried out of the lubricant container, continuing such circulation until the container is cleaned, simultaneously operating said moving parts, finally withdrawing said flushing oil from said container and thereafter preventing the return of any substantial portion thereof to said container, and thereafter introducing to said container a fresh charge of lubricant, no substantial quantity of which had heretofore been introduced thereto.

7. A process which comprises withdrawing by gravity substantially all of the used lubricant from a lubricant container, and preventing the return of any substantial portion thereof to said container, thereafter introducing a limited quantity of flushing liquid into said lubricant container, no substantial amount of which had been heretofore used in said container, in then circulating repeatedly through and from such container said flushing liquid under pressure, and in such circulation subjecting the flushing liquid to filtration action to catch and retain the foreign matter carried out of the lubricant container, continuing such circulation until the container is cleaned, finally withdrawing said flushing liquid from said container and thereafter preventing the return of any substantial portion thereof to said container, and thereafter introducing to said container a fresh charge of lubricant, no substantial amount of which had heretofore been introduced thereto.

8. A process which comprises withdrawing from a lubricant container substantially all of the used lubricant therein and passing same to suitable storage, thereafter introducing into said lubricant container flushing liquid, no substantial amount of which had heretofore been used in said container, thereafter circulating repeatedly through and from such container said flushing liquid under pressure, and in such circulation subjecting the flushing oil to filtration action to catch and retain the foreign matter carried out of the lubricant container, continuing such circulation until the container is cleaned, finally withdrawing such flushing liquid from said container and passing same to suitable storage, and thereafter introducing to said container a fresh charge of lubricant, no substantial amount of which had heretofore been introduced thereto.

9. A process which comprises withdrawing used lubricant from a lubricant container and preventing the return of any substantial portion thereof to the container, thereafter introducing a limited quantity of flushing liquid into said lubricant container, no substantial amount of which had heretofore been used in said container, maintaining a cyclic circulation of said limited quantity of flushing liquid downwardly into said container and under pressure to force the crank case adulteration downwardly, simultaneously withdrawing the flushing liquid from the lower portion of the container and passing it through a filtering medium and thence back to the container, repeating this cyclic circulation of the flushing oil until the crank case has been cleaned and finally withdrawing said flushing liquid, and thereafter preventing the return of any substantial portion thereof to said container.

10. A process which comprises withdrawing used lubricant from a lubricant container of a motor vehicle and preventing the return of any substantial portion thereof to said container, thereafter introducing a limited quantity of the flushing liquid into said container, no substantial amount of which had heretofore been used in said container, maintaining a cyclic circulation of said limited quantity of flushing liquid downwardly into said container under pressure, and simultaneously withdrawing the oil from the lower portion of the container, effecting the separation of the impurities during each cyclic circulation thereof and continuing the circulation of the oil until crank case adulteration has been removed, thereafter removing the flushing oil and preventing the return of any substantial portion thereof to the container and finally recharging the container with a fresh charge of lubricating oil.

WILLIAM L. OSBORNE.